(12) United States Patent
Lohmar et al.

(10) Patent No.: US 10,334,018 B2
(45) Date of Patent: Jun. 25, 2019

(54) PROCESSING OF DATA FILES

(71) Applicant: Telefonaktiebolaget LM Ericsson (publ), Stockholm (SE)

(72) Inventors: Thorsten Lohmar, Aachen (DE); Ibtissam El Khayat, Glons (BE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 230 days.

(21) Appl. No.: 15/110,781

(22) PCT Filed: Jan. 14, 2015

(86) PCT No.: PCT/EP2015/050562
§ 371 (c)(1),
(2) Date: Jul. 11, 2016

(87) PCT Pub. No.: WO2015/107067
PCT Pub. Date: Jul. 23, 2015

(65) Prior Publication Data
US 2016/0337439 A1  Nov. 17, 2016

Related U.S. Application Data

(60) Provisional application No. 61/927,719, filed on Jan. 15, 2014.

(51) Int. Cl.
*H04L 29/08* (2006.01)
*H04L 12/823* (2013.01)
(Continued)

(52) U.S. Cl.
CPC ............ *H04L 67/06* (2013.01); *H04L 1/0041* (2013.01); *H04L 1/0057* (2013.01); *H04L 47/32* (2013.01);
(Continued)

(58) Field of Classification Search
CPC ......... H04L 67/02; H04L 67/06; H04L 67/10; H04L 65/608; H04L 69/22; H04L 69/28; H04L 47/32; H04L 1/0041; H04L 1/0057
See application file for complete search history.

(56) References Cited

U.S. PATENT DOCUMENTS 6,263,396 B1 * 7/2001 Cottle ..................... G09G 5/14
                                                    348/E11.021
6,313,763 B1 * 11/2001 Lambert ................. H04L 29/06
                                                    341/50

(Continued)

OTHER PUBLICATIONS

3rd Generation Partnership Project, "3rd Generation Partnership Project; Technical Specification Group Services and System Aspects; Multimedia Broadcast/Multicast Service (MBMS); Protocols and codecs (Release 12)", Technical Specification, 3GPP TS 26.346 V12.0.0, Dec. 1, 2013, pp. 1-178, 3GPP, France.

(Continued)

*Primary Examiner* — Kostas J Katsikis
(74) *Attorney, Agent, or Firm* — Coats & Bennett, PLLC

(57) ABSTRACT

In general, it is proposed to define a new expiry mechanism for a data file being received at the client. In the following it is proposed that the expiry time on the receiver side should be "shortly" after a possible reception of all packets. It is proposed that the receiver should know as precisely as possible that no additional packets for that data file are expected anymore. As soon as the receiver can safely regard the reception of the file, the receiver could either move on to the next segment (delay optimization) or try to make use of the received information.

24 Claims, 11 Drawing Sheets

(51) Int. Cl.
*H04L 1/00* (2006.01)
*H04L 29/06* (2006.01)
(52) U.S. Cl.
CPC ............ *H04L 65/608* (2013.01); *H04L 67/02* (2013.01); *H04L 67/10* (2013.01); *H04L 69/22* (2013.01); *H04L 69/28* (2013.01)

(56) References Cited

U.S. PATENT DOCUMENTS

| | | | | |
|---|---|---|---|---|
| 8,311,002 | B2* | 11/2012 | Nyberg | H04W 72/1284 |
| | | | | 370/329 |
| 8,767,547 | B2* | 7/2014 | Adams | H04L 47/10 |
| | | | | 370/235 |
| 2006/0045083 | A1* | 3/2006 | Hasty, Jr. | H04W 16/14 |
| | | | | 370/389 |
| 2006/0234732 | A1* | 10/2006 | Kim | H04M 1/72552 |
| | | | | 455/466 |
| 2007/0192723 | A1* | 8/2007 | Anzelde | G06F 9/451 |
| | | | | 715/772 |
| 2008/0140853 | A1* | 6/2008 | Harrison | H04L 47/10 |
| | | | | 709/231 |
| 2008/0285496 | A1 | 11/2008 | Fuchs et al. | |
| 2009/0313661 | A1* | 12/2009 | Liu | H04N 7/17318 |
| | | | | 725/87 |
| 2010/0107104 | A1* | 4/2010 | Bruce | G06F 17/30147 |
| | | | | 715/772 |
| 2010/0211668 | A1* | 8/2010 | Dolganow | H04L 67/2819 |
| | | | | 709/224 |
| 2012/0101973 | A1* | 4/2012 | Ito | G06F 17/30221 |
| | | | | 706/50 |
| 2013/0077498 | A1* | 3/2013 | Shi | H04W 24/02 |
| | | | | 370/242 |
| 2014/0173104 | A1* | 6/2014 | Zhou | H04L 43/026 |
| | | | | 709/224 |
| 2014/0254466 | A1* | 9/2014 | Wurster | H04L 12/189 |
| | | | | 370/312 |
| 2014/0314099 | A1* | 10/2014 | Dress | H04L 45/62 |
| | | | | 370/422 |
| 2016/0006639 | A1* | 1/2016 | Wallman | H04L 69/22 |
| | | | | 370/241.1 |
| 2017/0171169 | A1* | 6/2017 | Lee | H04L 63/0428 |

OTHER PUBLICATIONS

ISO/IEC, "Information technology—Dynamic adaptive streaming over HTTP (DASH)—Part 1: Media presentation description and segment formats", International Standard, ISO/IEC JTC 1/SC 29, Version 2.1c2, ISO/IEC 23009-1:2012(E), Jan. 5, 2012, pp. 1-133, ISO.

3rd Generation Partnership Project, "3rd Generation Partnership Project; Technical Specification Group Services and System Aspects; Transparent end-to-end Packet-switched Streaming Service (PSS); 3GPP SMIL language profile (Release 12)", 3GPP TS 26.246 V12.0.0, Sep. 1, 2014, pp. 1-17, 3GPP, France.

Paila, T., et al., "FLUTE—File Delivery over Unidirectional Transport", Network Working Group Request for Comments: 3926, Oct. 1, 2004, pp. 1-35, The Internet Society.

* cited by examiner

| Transport Object Id (TOI) | Expires | Content Location (host/path/name) | Content-MD5 (optional) |
|---|---|---|---|
| 5 | A | www.ex.com/p/clip1.mpg | ODZiYTU1OTFkZGY2NWY5ODh= |
| 6 | A | www.ex.com/p/clip2.mpg | |
| 9 | B | www.ex.com/p/page1.html | |
| 10 | B | www.ex.com/p/page2.html | |

Fig.2

Input File Names http://www.provider.com/feed1/video/seg_9.m4s
http://www.provider.com/feed1/video/seg_10.m4s
http://www.provider.com/feed1/video/seg_11.m4s
http://www.provider.com/feed1/video/seg_12.m4s
http://www.provider.com/feed1/video/seg_13.m4s

Static Filename Template http://www.provider.com/feed1/video/seg_%d.m4s
(in c printf format)

Fig.3

PROCESSING OF DATA FILES

TECHNICAL FIELD

The present disclosure relates to techniques for providing data file to a client.

The present disclosure may be practiced within network solutions using broadcast for transmitting data files. In particular the embodiments discussed herein may be used in a scenario using MBMS, eMBMS broadcast systems or other systems providing multicast and/or broadcast transmission techniques like IP-Multicast in DSL access system (IPTV) or DVB-S.

BACKGROUND

DASH Dynamic adaptive streaming over HTTP is intended to support a media streaming model for delivery of media content. DASH provides streaming technique, which adapts the provision of media stream to the currently available link bitrates as disclosed in "Dynamic adaptive streaming over HTTP (DASH)—Part 1: Media presentation description and segment formats", ISO/IEC 23009-1:2012 (E), Version 2.1c2. DASH is designed as a client controlled adaptive HTTP streaming protocol. That means, that the server describes a set of available media qualities for example as a manifest file being provided to the users and the user selects depending on the available link bitrate a media representation matching the current link bitrate. Apple HTTP Live Streaming (HLS) is another example of adaptive streaming technique.

Multicast Broadcast Multimedia service MBMS as defined in 3GPP TS 26.246 version 12.0.0 "Multimedia Broadcast/Multicast Service (MBMS); Architecture and functional description" (2013-12) is a point-to-multipoint service in which data is transmitted from a single source entity to multiple recipients. Transmitting the same data to multiple recipients allows network resources to be shared. MBMS is especially applicable, when many users in a cell or any broadcast area use the same stream quality. For example in urban areas the same service may be simultaneously offered to a number of users with a higher bitrate then in sub-urban areas.

MBMS download delivery method uses FLUTE protocol when delivering DASH-formatted content over MBMS bearers. The FLUTE protocol (RFC 3926) is used for file delivery over UDP. The FLUTE protocol is selected by MBMS, DVB-H IP Datacast and OMA Mobile Broadcast Services as file delivery protocol. FLUTE in the Broadcast Multicast Server (BM-SC) cares about partitioning a media file into a sequence of media segments, namely UDP packets. Thus, FLUTE is a protocol, which allows delivery of files, like DASH files over broadcast using UDP as a transport protocol.

FLUTE is built on top of the Asynchronous Layered Coding (ALC) protocol. ALC is intended to transmit one or more transmission objects to multiple receivers. Each object is uniquely identified by a LCT Transport Object Identifier (TOI). ALC is carried using UDP over IP packets. Every IP packet, which is generated by partitioning of a data file carries the TOI value in the packet header.

FLUTE adds the needed mechanism of associating HTTP like metadata such as a Content-Location and Content-Type to an LCT Transmission Object. In particular, FLUTE defines the so-called File Delivery Table (FDT), which is basically a list containing an association of file metadata to the TOIs. The client maintains the FDT and the sender can add entries by using FDT Instances, which are sent as Transmission Objects. In particular in FLUTE, the FDT Instance carries among other parameters a File Delivery Descriptor which contains file properties such as File Name, Content Location and File-Type and also an expiry timestamp or timer or time. Further the FDT table provides an association between the File Delivery Descriptor, the TOI and the expiry time. The expiry value is given as absolute NTP timestamp. Since each FLUTE receiver maintains the FDT, the purpose of sending FDT Instance is to update or extend the File Delivery Table at the receiver. The FDT Instance expiry time, "expires", determines the expiry of the TOI to File Descriptor association or in other words the expiry of the FDT instance.

Each FLUTE receiver maintains the File Delivery Table (FDT), which is depicted as example in FIG. 2. Thus according to FIG. 2 an object or in this case a file has an assigned TOI, first column. The second column, called "expires" states when a particular file, for example with the TOI 5 expires, here at time A. The column "Content Location" provides an URL, where the content is located and may be fetched. The Content-MD5 may be used to differentiate different versions of the same file. According to FIG. 2, files with TOI 5 and 6 have the same expiry time A and with TOI 9 and 10 the same expiry time B. Thus, the sender (BM-SC) defines the expiry of the TOI to File Delivery Descriptor association with an absolute NTP timestamp with one timestamp for one or more files as depicted in FIG. 2.

According to the MBMS Specification TS 26.346 V12.0.0 (2013-12) "Multimedia Broadcast/Multicast Service (MBMS); Protocols and codecs", the FDT expiry mechanism is used to indicate the end of transmission time for a certain object or a data file.

The problem with the existing solution is that the provided expiry time does not consider the characteristics of a transmission, like a transmission delay. The transmission delay depends on various network components including radio parameters. For example, the end to end delay between the BM-SC down to the UE depends on how certain parameters have been configured on an eNodeB. If all eNodeB have good and fast backhaul connection then the transmission delay is expected to be small. The speed of the eNodeB hardware as well as the buffering has also impact on the end-to-end delay. Further also the speed of the BM-SC hardware impacts the end-to-end system. For this reason the end-to-end delay can largely differ between systems and this leads also to varying transmission time of a data file.

Further, any sort of communication is prone to packet losses. The sender cannot influence which packet gets lost. It might be the first, or a burst at the beginning of a transmission. Consequently data packets carrying the FDT table information (i.e. FDT Instance objects) may get lost or corrupted. Packets may be sent on purpose out of sequence.

Further, the receiver needs to be precisely time synchronized when getting an absolute expiry time. Today's phones are only loosely synchronized. If the network supports the Network Time & Zone solution (NITZ), then a timestamp is only provided at phone restart. Consequence is that many phones are several seconds off. NITZ is not designed to provide sub-second precision.

DASH operates by segmenting continuous media content stream into a sequence of media segments at a server side. Further a media segment, like the DASH media segment is typically subdivided into multiple data packets, UDP data packets, wherein the data packets have a roughly constant duration of time, the so called data packet duration. Each data packet is uniquely marked with a sequence number, so that the client can re-assemble the file. For the MBMS broadcast, a media segment is partitioned into multiple FLUTE/UDP packets. Optionally, FEC redundancy is calculated and added as overhead (i.e. additional packets containing redundant data) to the transmission of a data file. A data file server, like the BM-SC performs the generation of the UDP data packets by partitioning the media segments and calculating the FEC redundancy. The segmentation is performed by a Live Encoder LE, wherein a LE comprises a Segmenter and may comprise an Encoder. However the data files as generated by the LE have different sizes in the sense that they comprise a different number of data packets, and therefore the data packets have only a roughly constant duration. The LEs are namely vendor specific. Each live encoder vendor has its own algorithms to increase compression efficiency while keeping a certain end-to-end delay. In case of broadcast the generated media segments are on average 100 kByte size, some are larger, e.g. up to 130 kByte and some are smaller, e.g. up to 70 kByte, then as mentioned when generating media segments, each segment might have a different number of UDP data packets. Thus, the segment sizes are different.

Further for broadcast transmission typically a constant bitrate bearer on a transmission link is provided. For example, MBMS for LTE (eMBMS) offers a Constant Bitrate Broadcast Bearer Service. The bitrate is defined though the GBR (Guarantees Bitrate). Thus, in case of broadcast there is a constant bitrate bearer allocated for broadcast transmission. For example the allocated bitrate might be 1 Mbps that means that it takes 0.5 sec for a segment of size 500 kb to be transmitted and a segment of size 1500 kb needs 1.5 sec. However since the segment sizes may have different sizes, consequently time for transmission over a constant bitrate may differ.

Therefore on one side different data file sizes are generated, so that the transmission of the data files via a network takes respectively different time duration and on the other side due to the varying end-to-end delay in the network, the variation of the transmission of a data file in time is intensified, so that the static set expiry time at the server side may not provide an accurate end of transmission time point.

Furthermore, the existing FLUTE expiry mechanism does not work with a static File Delivery Descriptor tables. The idea of the static file delivery descriptors is to avoid sending the FLUTE FDT Instances. Thus, the required information are sent at the beginning of a session and no updates are sent afterwards.

The key idea of this static file descriptor tables is, that the filenames of adaptive bitrate streaming segments (like DASH or HLS) contain a running index. This index is typically increased by one. Since the TOI is also a unique index, the idea is to provide all static information of the File Descriptors, in form of a template, so that the client can derive the filename by combining the TOI with a basic filename template.

FIG. 3 depicts that principle. On the left side a sequence of Input files with the URL address and a running index (here from 9 to 13) is provided. The filename can be expressed by a template (right side), where the format tag % d is replaced by the value of the TOI from the transport.

With the template form, the URL is constructed by replacing a certain part of the template by the index TOI. A template form may have the form in C printf format: http://( . . . )/seg_% d.3gs where % d is replaced by the value of TOI to result in the URL to be used for requesting the subsequent media segments The problem with the way of avoiding the FDT Instance fields and providing the File Descriptors as a static File Delivery Descriptor Table is the missing provision of the expiry time for the TOI association. However, the intention of the expiry mechanism is to allow the re-use of the TOI value for another file transmission.

Moreover, the user needs to have an expiry time as a trigger for an effective managing of its memory. In particular, from a client memory management perspective, the user should be able to decide when to delete the received data packet of a data file.

SUMMARY

There is a demand for a technique for an efficient provision of data file to a user. In particular there is a demand to provide a mechanism for an efficient memory management on the user side.

The invention is embodied in independent claims. Advantageous embodiments are described in the dependent claims.

The demand is satisfied with a method for providing a data file to a client wherein the data file is transmitted from a sender to the client over a communication network. It is proposed to provide a data file comprising data packets wherein the data file has a data file size. In the next step it is proposed to estimate a data file transfer duration being based on a transmission bitrate towards the client and the data file size. As next an expiry time of a remaining data file still to be sent is estimated when a data packet towards the client is sent. Hereby the estimation of the expiry time is based on the data file transfer duration and a duration for transmission of already sent data packets so that the expiry time is adapted to inform when the transmission of the data file is completed. In the next step the estimated expiry time is signaled to the client.

Further the demand is satisfied with a method for providing a data file comprising data packets wherein the data packets are transmitted from a sender to the client over a communication network. In the first step a data packet of the data file is received. As next the data packet for an expiry time for the data file is checked wherein the expiry time is adapted to inform when a transmission of a remaining data file still to be received is completed. Further it is proposed that the data packet is stored and a decision is taken on a construction of the data file.

Further the demand is satisfied with a sender device adapted to provide a data file to a client wherein the data file is transmitted from the sender device to the client over a communication network. The sender comprises a provision unit adapted to provide the data file comprising data packets and having a data file size. Further there is an estimation unit adapted to estimate a data file transfer duration being based on a transmission bitrate towards the client and the data file size. Moreover there is a processor adapted to estimate an expiry time of a remaining data file still to be sent when sending a data packet towards the client wherein the estimation of the expiry time is based on the data file transfer duration and a duration for transmission of already sent data packets so that the expiry time is adapted to inform when the transmission of the data file is completed. Further there is a sender unit adapted to signal the estimated expiry time to the client when sending a data packet.

Further the demand is satisfied with a client device which is configured to provide a data file comprising data packets wherein the data packets are transmitted from a sender to the client device over a communication network. The client device comprises a receiver adapted to receive a data packet of the data file. Further there is a checking unit adapted to check the data packet for an expiry time for the data file wherein the expiry time is adapted to inform when a transmission of a remaining data file still to be received is completed. There is a storage adapted to store the data packet and a decision unit adapted to decide on construction of the data file.

The proposed solutions provide an expiry time which is calculated providing a value matching the end point of a transmission in the best way.

BRIEF DESCRIPTION OF THE DRAWINGS

In the following, the invention will further be described with reference to exemplary embodiments illustrated in the figures, in which:

FIG. 2 shows an embodiment of a FDT table;
FIG. 3 shows a generation of a static filename template.

DETAILED DESCRIPTION

Figure 1:
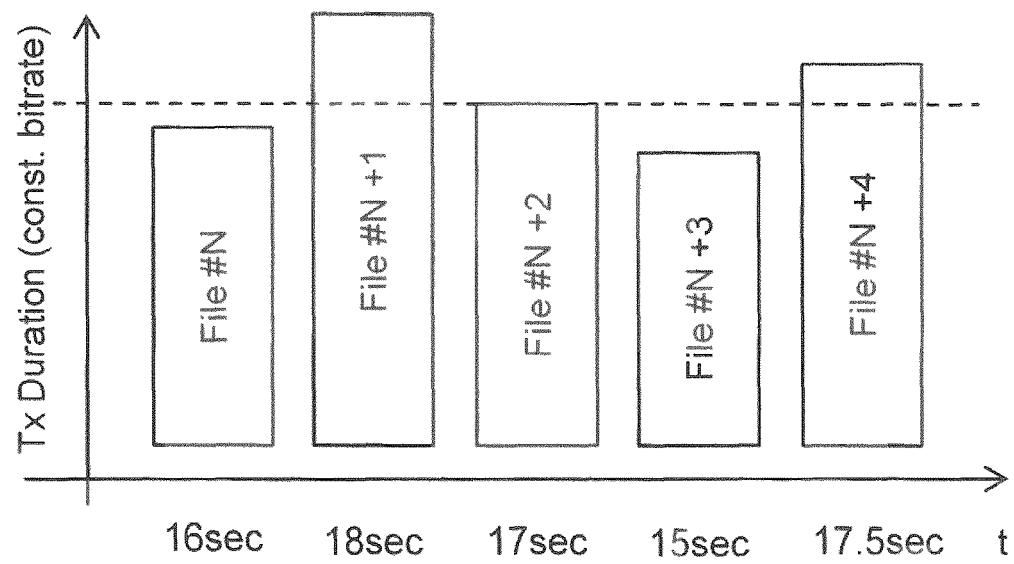
FIG. 1 shows an embodiment for varying duration of file.

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled artisan will appreciate that the current invention may be practised with any wireless network like for example UMTS, GSM or LTE networks. As another example, the invention may also be implemented in short-range wireless networks such as WLAN or Bluetooth systems or in wireline networks, for example in any IP-based networks, like IMS network.

The invention may be practiced with broadcast networks, for example TV or with hybrid networks comprising a broadcast network and a mobile network, for example a DVB-H (Digital Video Broadcast-Handhelds) and a 3GPP mobile network. Basically, the invention may be practiced within any network environment providing file delivery or live video to a user over a telecommunication network.

DASH Dynamic adaptive streaming over HTTP is a protocol used for provision of media content. Said content may be transmitted using FLUTE protocol in case of broadcast transmission. Other adaptive HTTP streaming schemes such as Apple HTTP Live Streaming (HLS) may be supported as well.

A player on the user side is adapted to provide the received data to the user. In one embodiment it is proposed that the streaming player is a DASH player, in particular an MPEG-DASH player.

A user or a client might be any receiver device, like an end device or User Equipment (UE). In the following the terms user or client or user equipment UE or receiver are used as synonyms. If it is not mentioned explicitly the term user or client or UE or receiver is used in the sense of a hardware with a processor and memory performing the embodiments of the invention.

The sender may be any device providing server functionality in the system and being adapted to generate data packets from a data file and calculate the expiry time. It may be any server device, like a BM-SC server. If it is not mentioned explicitly the term sender or sender device is used in the sense of a hardware with a processor and memory performing the embodiments of the invention.

A data file may comprise any kind of data like video, audio data, binary data, images, text or any other kind of data. In the following the term media data, media content, media segment, segment or object are used as examples for a generic term, data file. An object may be a data file when the object has additional file attributes, like a file name. A media segment may be for example a DASH or HLS segment. The step of providing the data file comprises partitioning the data file into data packets when a data file is to be prepared for a transmission. Thus, a data packet is generated form a data file by means of partitioning of said data file into data packets. The step of providing the data file comprises partitioning a data file into data packets with a roughly constant length of payload data. Further the step of providing the data file comprises estimating a number of the data packets in the data file to be sent. In particular this step may be performed when estimating the data file transfer duration during the transmission of the data file, for example when said duration is to be calculated again.

Data file transfer duration is the time needed for transmission of a data file from a sender to a client. Said duration is based on the size of the data file and a transmission bitrate towards the client. The size may be expressed by a number of data packets building the data file.

When estimating the data file transfer duration the Forward Error Correction (FEC) overhead may be considered. Further the data file transfer duration may be influenced by adding any kind of packet overhead.

In an embodiment of the invention is proposed to update the data file transfer duration during transmission of the data packets. For example if the sender notices that the transmission will take longer or shorter than originally estimated, a new duration of the data file is to be estimated so that the calculation of the expiry time is based on an updated data file transfer duration. Thus the sender measures or keeps in any preferably way track of the duration of the already sent data packets and calculates the data file transfer duration for the data packets still to be sent. The time duration for the already sent data packets may vary, the variation may be noticed at the sender side due to lower/faster provision of the data packets for sending (for example the emptying of the sender buffer may differ). Furthermore the sender may be adapted to receive any changes in the transmission bitrate.

In one embodiment it is proposed to add to the estimated data file transfer duration a safety margin in order to consider some end to end delays variations when estimating the expiry time.

The expiry time is calculated at the sender and provides information when the transmission of the data packets of the data file is completed. When sending a data packet at the sender side the expiry time is estimated. The estimation is based on the data file transfer duration and duration for transmission of the already sent data packets. In the following the term "timeout information" is used as a synonym for the expiry time.

In one embodiment it is proposed that the expiry time is a relative time showing an expected remaining time for transmission of the remaining data packets. When sending a data packet at the sender side the expiry time is estimated, in particular the expiry time for the remaining data file which is still to be sent is calculated. In other words the expiry time informs when the client is supposed to receive the remaining part of the data file. The expiry time is expressed as relative value, from the point of receiving a data packet.

The relative time may be calculated by decrementing the duration for transmission of already sent data packets from the estimated data file transfer duration. Thus, the calculation is based on the estimated data file transfer duration and the time which passed for the already sent data packets.

In an embodiment it is proposed to update the data file transfer duration. For example if the sender notices that the transmission will take longer or shorter than originally estimated, a new duration of the data file is to be estimated so that the calculation of the expiry time is based on an updated data file transfer duration.

In one embodiment it is proposed to keep track on a number of the already sent data packets.

In case data packets are sent with a fixed interval, so called inter transmit interval, the calculation is based on the number of already sent data packets and on the inter transmit interval. Thus the number of already sent data packets with a certain packet size wherein each data packet is sent every inter transmit interval provides the time duration for transmission of the already sent data packets.

In one embodiment, a constant inter-transmit intervals are considered. However the inter-transmit interval may differ depending on the data packet size.

In a further embodiment it is proposed to provide the expiry time as an absolute time showing the time at which the transmission of the data packets of the data file is completed, wherein the absolute time is estimated by compensating some end to end delays. The absolute expiry time is calculated by adding to the starting absolute system time the estimated data file transfer duration for the transmission of the data file.

In one embodiment it is proposed to perform the estimation of the expiry time for every data packet to be sent. This ensures that the client receives adequate information when the transmission of the data file is completed. In this case it is proposed to estimate the expiry time by decrementing the expiry time estimated for a previous data packet with the estimated inter transmit interval.

In order to save transmission resources it is proposed to perform the estimation of the expiry time for every n data packet to be sent or for random data packets.

It is proposed that the estimated expiry time is to be signaled to the user. The signaling step may be realized in any preferably way. For example the expiry time may be included into a data packet header of the data packet to be sent. In one embodiment it is proposed to include the expiry time in a FLUTE packet carrying the expiry time assigned to a File Descriptor entry.

Further it is proposed to re-use an identity number for identifying another data file when the expiry time expires at the client side. Thus the sender may use the identity number for another data file again. In the embodiment, in which the data file is identified by a Transport Object Identifier TOI, when the expiry time occurs, the TOI may be re-used for another data file. The sender maintains a TOI database as already mentioned and allocates the TOI value to the data file until expiry time. Thus after the expiry of the expiry time sender can re-use the TOI value for other data file.

On the client side it is proposed to check the received data packets for the expiry time for the data file. If the expiry time is signaled in a data packet header, then it is proposed to read out the header of the received data packet. If the expiry time is signaled in a FLUTE packet, then it is proposed to read out said FLUTE packet carrying the expiry time assigned to a file delivery descriptor entry.

In one embodiment it is proposed that the expiry time is a relative time, in this case the received time is used at the client as a remaining time for reception of the remaining data packets. In case the expiry time is an absolute time then the remaining time for reception of the remaining data packets is calculated at the client as a difference between the received expiry time and the current absolute system time.

When receiving a data packet the client takes a decision based on the stored data packets whether to construct the data packet or to discard the stored data packets. The decision may be performed when the expiry time elapses or during the reception of the data packets.

The client may further decide by the constructing to perform an error concealment procedure being a technique in which an error in received data is replaced by content, often interpolated from other parts of the received data in order to conceal the presence of the error in the original content. Further it may perform a recovering of the data file based on the stored data or request a retransmission of some data packets. When a data file is recovered it is proposed to ignore all subsequently received data packets with a same identity number until expiry time. Thus, it is proposed that data packets received after recovery and belonging to the same media object are ignored until the expiry time. In one embodiment it is proposed to set an internal marker indicating that subsequent data packets belonging to the same object, thus carrying the same identity number are to be discarded. Further it is proposed that when the expiry time expires the internal marker is cleared for the particular identity number.

The client may also decide to discard the stored data packets, when the expiry time expires.

Further it is proposed to clean up a memory by removing the stored data packet

Furthermore it is proposed to release the identity number when the expiry time expires. This step allows that the identity number is used for another data file again. In one embodiment the function of the identity number is performed by the Transport Object Identifier TOI.

In general, it is proposed to define a new expiry mechanism for a data file being received at the client. It is proposed that the receiver should know as precisely as possible that no additional packets for certain data file are to be expected. As soon as the receiver can safely regard the reception of the file as completed, the receiver could either move on to the next segment (delay optimization) or try to make use of the received information and construct the data file. Further the receiver may start preparing for the next data file by cleaning up the memory. The meaning of the expiry time is that the user discards data packets coming beyond the expiry time and starts to make the received file available to higher protocol layers. When the timer expires, either the receiver is able to provide the data file to the player because sufficient data packets has been received or all data is to be discarded because the reconstruction of the data file is not possible. According to the embodiments of the invention, the estimation of the expiry time ensures that the time point is as accurate as possible so that no unnecessary discarding of the data packets takes place.

The sender or service device knows the file size of the transmission object and also the transmission bitrate for the object or any data file. The transmission bitrate may be the same for each data file in the sequence. However, the transmission bitrate may also change from data file to data file or more generally from object to object. Or even it may change during the transmission of the data file. Accordingly the sender can estimate the duration of the data packets still to be sent or in general the data file transfer duration, since this is the duration of the file still to be sent.

The BM-SC is a broadcast server being an embodiment of the server device. Data files like the DASH segments are typically larger than a single IP packet. In case of broadcast, a segment is partitioned into multiple FLUTE/UDP packets.

Optionally, as already mentioned FEC redundancy is calculated and added as overhead to the transmission of a data file.

The data files may be generated by the Live Encoder LE causing different sizes in the sense that the data files comprise a different number of data packets, like UDP data packets. Each live encoder vendor may have its own algorithms to increase compression efficiency while keeping a low end-to-end delay.

FIG. 1 depicts, a resulting data file over broadcast, when a Live Encoder LE is configured with a certain target bitrate. By determining the client buffer fill state, the LE has a certain flexibility to vary the encoding bitrate within a short time window. In the example according to FIG. 1, the transmission duration of a first media file (File #N) is set to 16 sec, while the next segment (File N+1) takes 18 sec. The LE is configured to produces a stream of an average target duration of 17 sec ((TargetEncoderBitrate*SegmentDuration)/Tx_bitrate), which is defined as Target Encoder Bitrate. If FEC redundancy is added, then the transmission duration increases proportionally with the FEC overhead.

Figure 4:
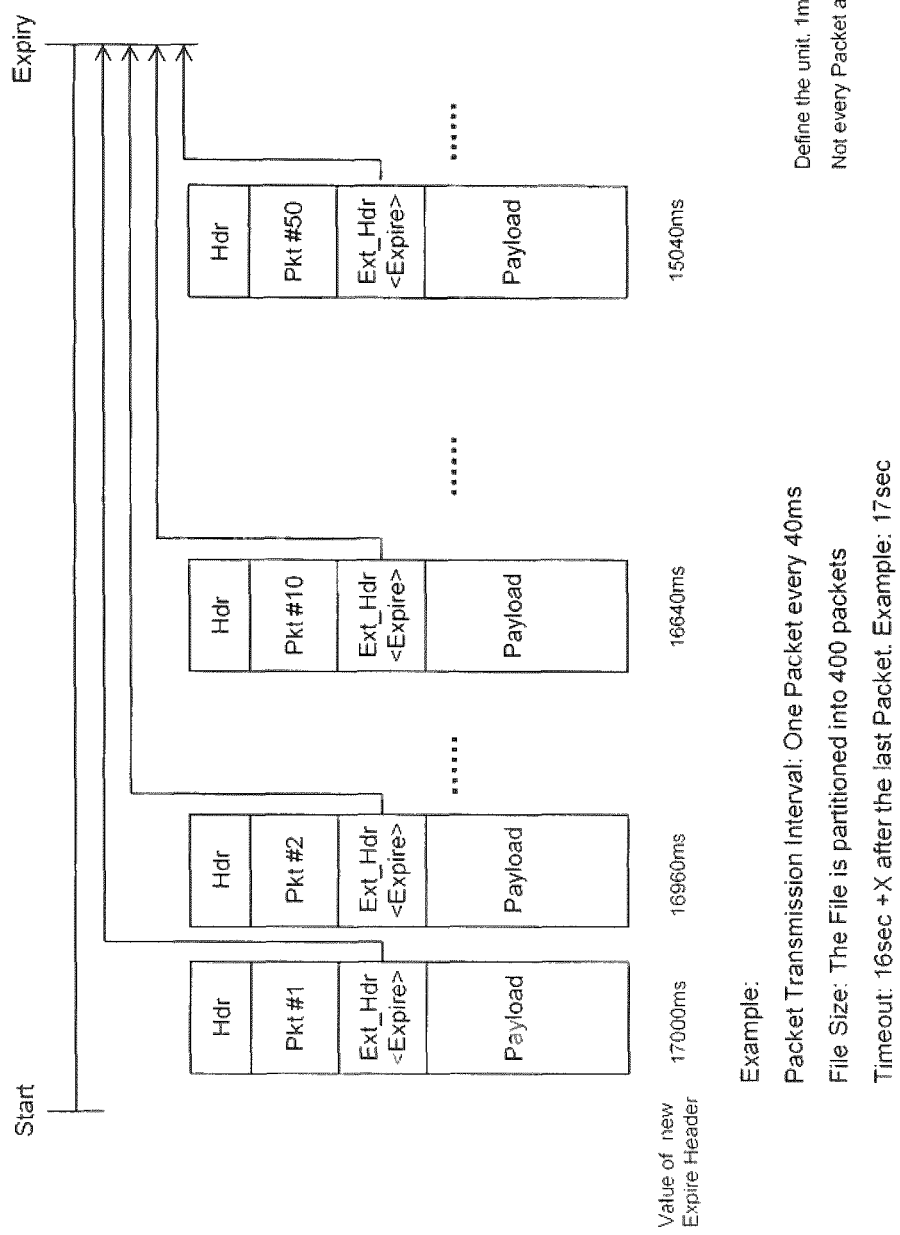
FIG. 4 shows an embodiment for estimation of an expiry time.

FIG. 4 depicts an embodiment of the present invention. After performing the partitioning for the data file at the sender side, said sender determines the number of data packet needed to carry the file (not shown). According to FIG. 4, the data file (which may be a DASH segment) plus the FEC overhead is partitioned into 400 IP packets. Due to the target bitrate, one packet needs to be sent every 40 ms. Then at least 40 ms takes a transmission of one data packet with the given target bitrate. The interval at which a data packet is to be sent, here the 40 ms, is called inter-transmit interval. The inter transmit interval corresponds at least to a duration for a transmission of one data packet when sending with a constant bitrate, called data packet duration.

In this embodiment the sender needs 16 sec to transmit the 400 packets with the 40 ms interval. Thus, the sender determines the expiry of the data file as 16 sec plus a safety margin of X sec. The sender uses here a safety margin of X=1 sec so, the expiry time for the whole data file is set to 17 sec after the reception of the first data packet. Since the first data packet might get lost, it is proposed that also the subsequent packets should carry timeout information. In this respect it is proposed that the expiry time, when sending a data packet is estimated. Thus, at the sender side when sending a data packet the expiry time for the remaining media file is estimated. The estimation of the expiry time is based on the data file transfer duration and duration for transmission of the already sent data packets so that the expiry time is adapted to inform when the transmission of the data packets of the media file is to be completed.

According to FIG. 4 the estimated expiry time is included into the header of the generated data packets. The expiry value of the first packet is 17000 ms, the expiry of the second packet is 16960 ms (thus, 17000 ms minus 40 ms) and the packet with the number 50 has the expiry time 15040 ms, as depicted under the shown data packets. Then according to one embodiment the duration for the data file is 17 sec, the duration for the data packet already sent is 49*40 sec, thus 1960 ms, so 17000-1960 results in 15040. In this embodiment, the expiry time point is expressed as a relative duration time for receiving the remaining data file from point of reception of the data packet carrying the estimated expiry time. The expiry time is decremented with each packet. In this example the estimation is based on the information that a data packet is sent at least every inter transmit interval, namely 40 ms.

Figure 12:
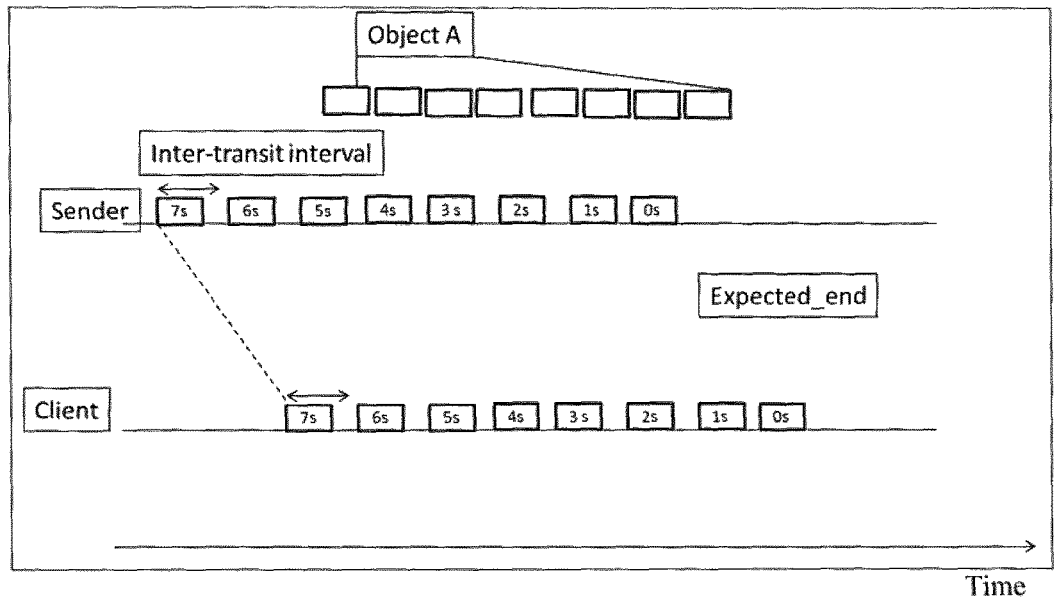
FIG. 12 shows an embodiment when using a constant pace delivery of data packets.

According to FIG. 12 an embodiment is presented when a data packet is sent with a constant inter transmit interval. At first an object like a data file is partitioned into data packets. For the first data packet the duration for the remaining data packet is estimated at the sender side, namely 7 sec. The data packets are sent with constant inter transmit interval of every 1 sec. At the client side the packets are received and each data packet carries the information when the transmission of the data file is to be completed.

In a further more general embodiment, the sender may estimate the time for the transmission of the remaining data file by taking the actual transmission duration for the data packet already sent. Thus instead of working with the estimated inter transmit interval, like in the example above 1 s, the sender calculates the actual duration of the transmission of the data packets already sent. It may be that some data packets are sent at the same time and after some inter transmit interval another burst of data packet is sent. Thus, the sender has the information about the duration of the transmission of the sent data packets which is then used for the estimation of the time duration for transmission of the remaining data file.

Figure 13:
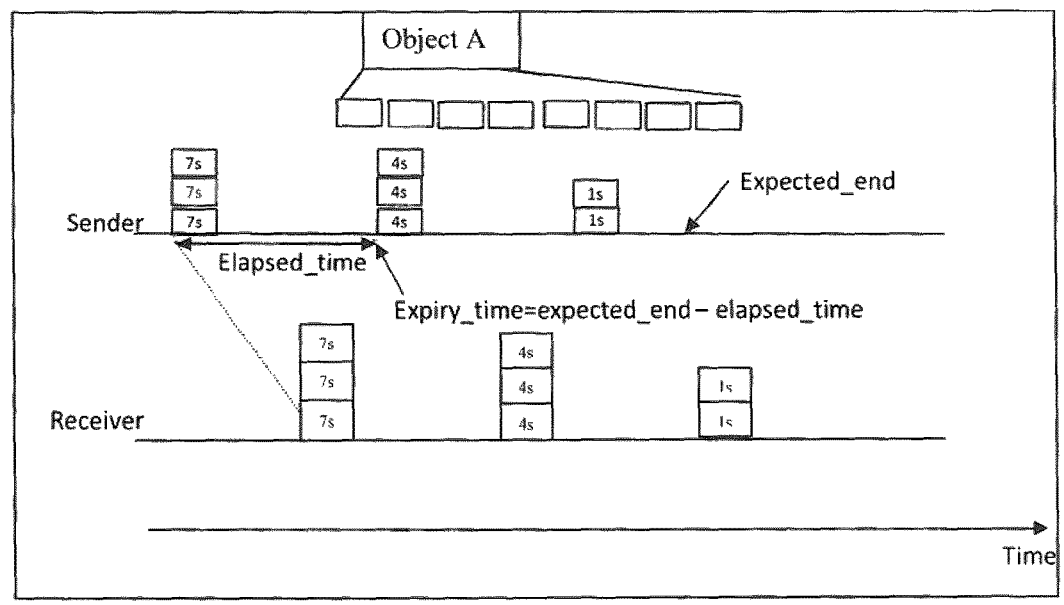
FIG. 13 shows an embodiment when applying a generic delivery of data packets.

This embodiment is present in FIG. 13 showing data packets of the object A being sent as a burst, a few data packets at the same time, for example 3 data packets at time point 7 s, 4 s and 2 data packets at time point 1 s. The estimated expiry time is consequently the same in the parallel sent data packets. When sending for example data packet with the expiry value 4 s, the sender estimates the expiry time as the expected time which is the estimated data file transfer duration minus the elapsed time which is the time lapsed after sending the first data packets or in other words the elapsed time is the duration for transmission of already sent data packets. The receiver when receiving data bursts receives also information of the expected end, then the data packets of a data burst carry the expiry time, according to FIG. 13, 3 data packets carry expiry time 7 s, the next 3 data packets of a burst carry 4 s and the last 2 data packets of a next burst 1 s.

In one embodiment it is proposed that each data packet, like for example each FLUTE packet carries the expiry information, thus the expiry of the TOI to File Descriptor entry.

In one embodiment it is proposed to send the expiry time with a fixed frequency, e.g. every $10^{th}$ packet to reduce the overhead. Such a solution is for example beneficial, when a number of data packets is sent.

To simplify the sender operations, the expiry time may be set more coarse-grained, by defining a range. For instance, a sequence of packets may carry the same expiry time. For instance, the expiry field may only be increased in steps of 200 ms, while the packet transmission interval remains still 40 ms. Thus, five packets may carry the same expiry time.

In the previous embodiments the time unit milliseconds has been used. However this should be seen as an example. Other time units may be also used. In one embodiment it is proposed to have a "timescale" field in the packet header or the in the static file delivery descriptor table, which may define the used time unit. The timescale field provides the timescale in "ticks per seconds". The expiry time in the packet headers are expressed in units of "ticks".

Figure 5:
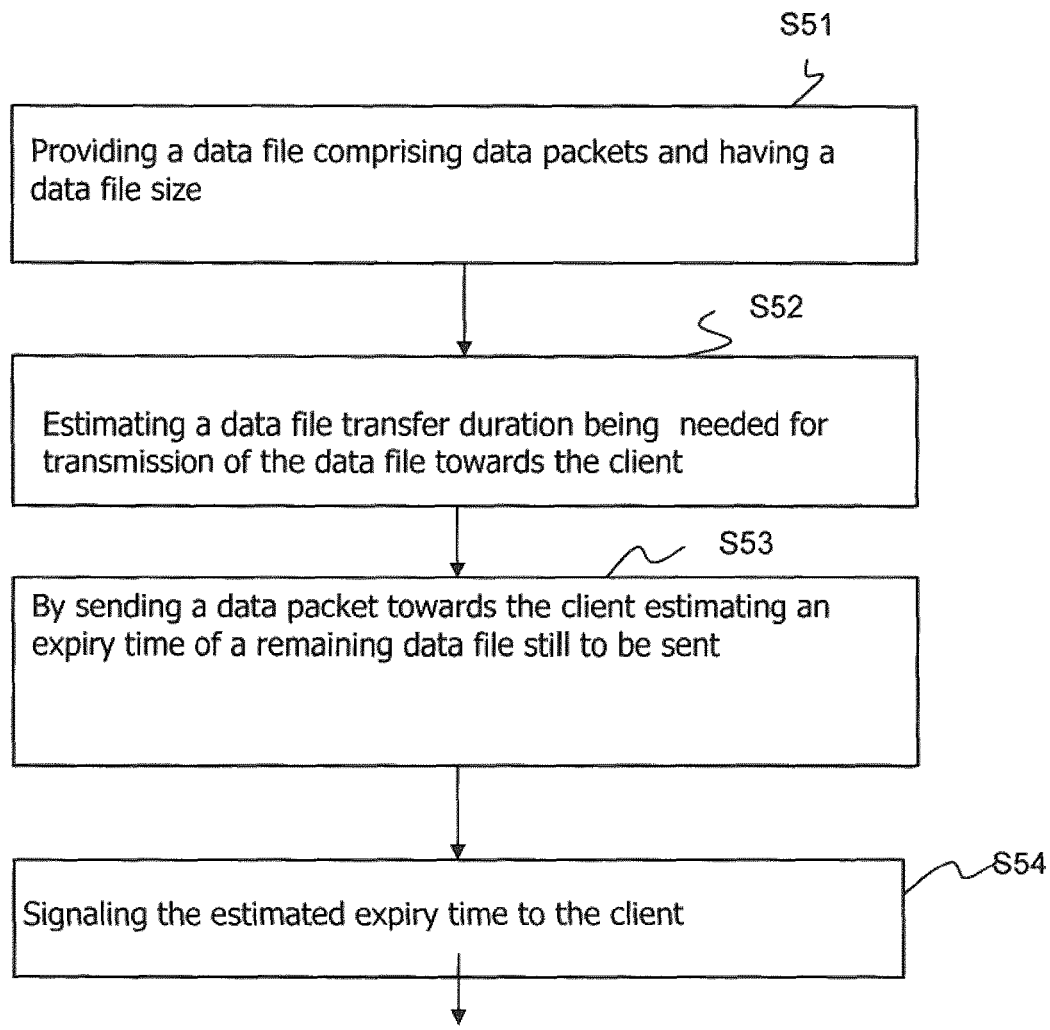
FIG. 5 shows a flowchart of a method in a server device according to one embodiment.

In the following an embodiment of the present disclosure is presented in respect to FIG. 5 showing a flow chart with steps according to an embodiment to be performed on the sender side.

In step S51 a data file comprising data packets is provided. The file has a data file size (S51). In the next step S52, a data file transfer duration is estimated, which is time needed for transmission of the data file still to be sent. The data file transfer duration is based on a transmission bitrate towards the client and the data file size. When sending a data packet towards the client an expiry time of a remaining data file still to be sent is estimated. The estimation of the expiry time is based on the data file transfer duration and the duration for transmission of already sent data packets S53. In step S54 the estimated expiry time is signaled to the client.

Figure 6:
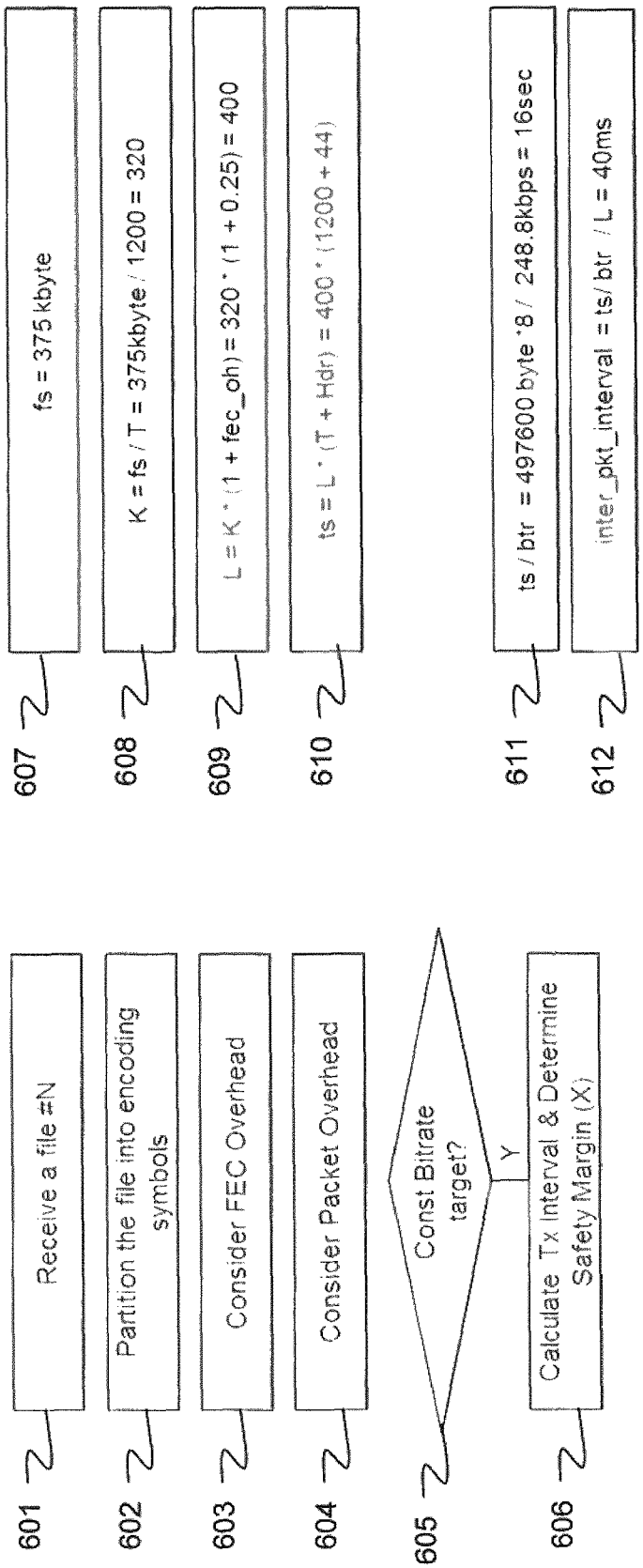
FIG. 6 shows an embodiment for initiation an estimation of the expiry time at the sender side.

In the following embodiment according to FIG. 6 is presented showing the behavior on the sender side.

For the proposed solution, the FLUTE sender, which may be the BM-SC calculates an expiry time. According to FIG. 6, N is the file number. For the sake of completeness it is to be mentioned that the file metadata such as filename, MIME type. etc may be derived from a file delivery descriptor for example in combination with packet header information. The file delivery descriptor is valid for a sequence of files like a sequence of DASH segments.

In the following embodiment it is assumed that all data files are sent with the same constant bitrate. The consequence of sending files with different sizes all at the same constant bitrate is that the transmission duration, thus the expiry time, may be different for each file.

Based on FIG. 6 left size
1. The BM-SC receives the file or at least the file size of the file #N, step 601
2. The BM-SC partitions the file into IP packet payloads. An IP packet may carry one or more encoding symbol of size T or in other words packet payloads. Herein the term symbol is used in the meaning of payload. FEC scheme requires that all encoding symbols (except the last) of a source blocks are of equal size, here T, step 602
3. The BM-SC considers the FEC overhead, since this influences the transmission duration, step 603
4. The BM-SC considers the packet overhead like for example a headers, since this influences also the transmission duration, step 604
5. When a constant bitrate is considered, step 605, the BM-SC calculates the inter packet transmission interval also called inter transmit interval Tx by calculating the transmission duration of the entire file (incl. FEC and header overhead) and dividing it by the number of the data packets. Additionally, the BM-SC estimates a safety margin (X) being a constant value compensating some transmission delay, step 606.

On the right side of FIG. 6 an example for calculation and estimation of the data packets, their duration and the data file transfer duration is presented.

Assuming that the data file has a length of 375 kbyte (fs), step 607 and the payload size of an IP data packet T is 1200 byte, then the number of data packets K is 320, step 608. In case the FEC overhead is added, then the FEC is to be considered by the calculation. In this example it is assumed that FEC overhead, fec_oh, is 0.25 of the data packet size for each IP packet. Thus the number of data packet with FEC overhead, L, is 400, step 609. In this embodiment also an additional packet overhead Hdr is considered, which is here 44 byte for each data packet. Correspondingly, the data file size, ts, is 497600 byte, step 610

If an IP packet carries more than one symbol as it is foreseen in some FEC schemes like Raptor FEC, the overhead per symbol is reduced and the formula requires slight adjustments to ts=L*(T+Hdr/G), wherein L is the number of data packets generated from a data file by considering the overhead, T the encoding symbol size and G the number of symbols per packet. Hdr is the amount of overhead bytes for each IP packet, containing G encoding symbols of each size T.

Assuming that the bitrate for transmission, btr, is 248.8 kbps, the duration for the data file is calculated as 16 sec, step 611. When dividing the data file transfer duration, ts/btr via the number of data packets, L, 400, then the outcome is 40 ms, which is the time at which each data packet is sent and expected at the client side, in FIG. 6 depicted as inter_pkt_interval, 612.

Figure 7:
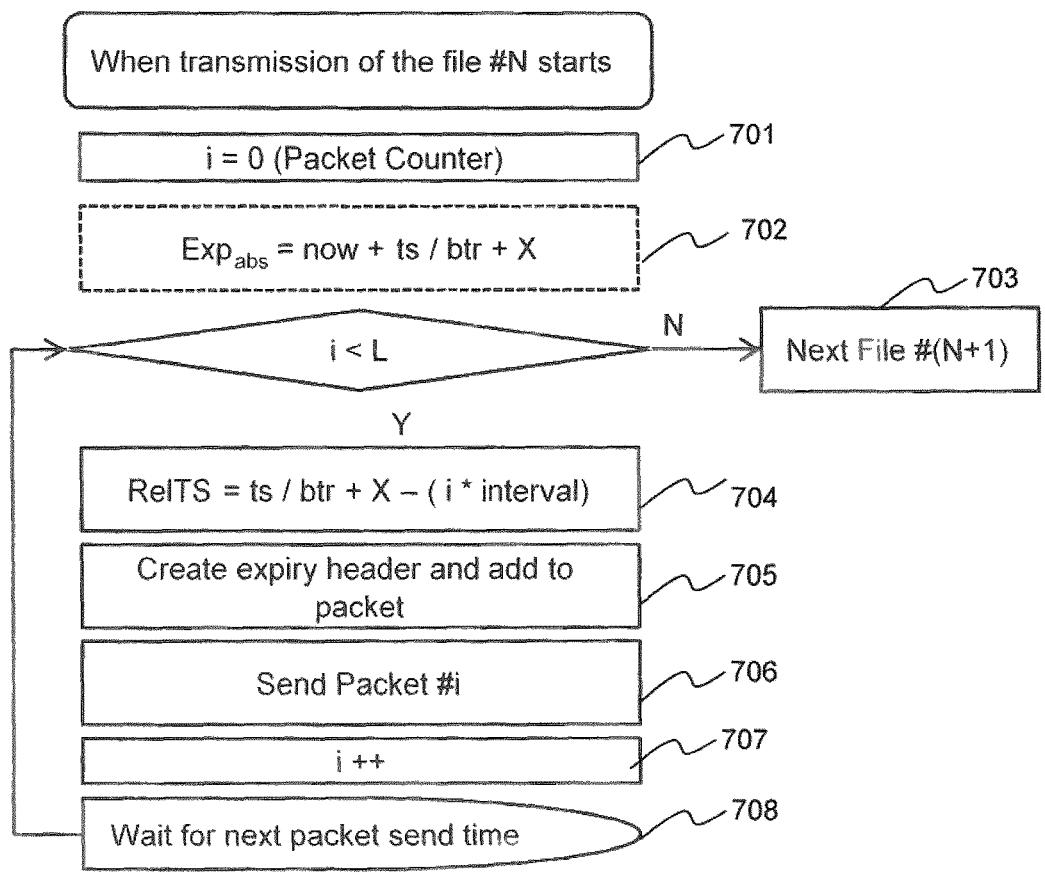
FIG. 7 shows an embodiment for estimation of the expiry time at the sender side.

In the following an embodiment of the present disclosure is presented in respect to FIG. 7 showing a flow chart with steps according to an embodiment to be performed on the sender side, in particular when sending a data packet and when estimating the expiry time.

In this embodiment the calculation of the duration of transmission of already sent data packets is based on a constant bitrate and a constant inter transmit interval. Thus, once the BM-SC has calculated the packet transmission interval also called inter transmit interval and the transmission duration of the data file, the BM-SC can start the transmission process. According to FIG. 7 the following steps are performed:
1. The BM-SC sets a packet counter i to zero, step 701
2. Optionally, the BM-SC calculates the expiry time by adding the transmission duration (ts/btr) plus the safety margin (X) to the current time now, step 702
3. If there are no data packets to be sent in the particular file, the bM-SC starts with a new file, step 703. Otherwise, if there are still data packets to be transmitted for a file (i<L), then the BM-SC calculates a new relative expiry time for that packet, step 704
    a. Alt A: BM-SC uses the expected remaining time to transmit all remaining data packets, plus the safety. When the inter transmit interval is constant, then the estimation is: ts/btr+X−(i*interval), with i being the packet number, starting from zero b. Alt B: Alternatively, the BM-SC may use the difference between $Exp_{abs}$ and now. This embodiment may be applied when BM-SC handles multiple sessions or when the BM-SC sends data packets in burst. So, the sum of the transmission intervals might not be accurate enough so that additionally or alternatively the sender estimates the absolute expiry time $Exp_{abs}$ which is calculated by adding to the starting absolute system time the estimated duration for the transmission of the data file. When sending a data packet the current system time now is read out and considered by estimating the difference between $Exp_{abs}$ and now. Thus, the difference provides the actual time for sending the remaining part of the data file.

4. The BM-SC inserts the expiry time into the according packet header. the expiry time may be added into every packet, or every n-th e.g. every $5^{th}$ data packet, step 705
5. The BM-SC sends the data packet with the number i, step 706
6. The BM-SC increments the packet counter, step 707
7. The BM-SC waits for the next packet transmission event, step 708.

Figure 8:
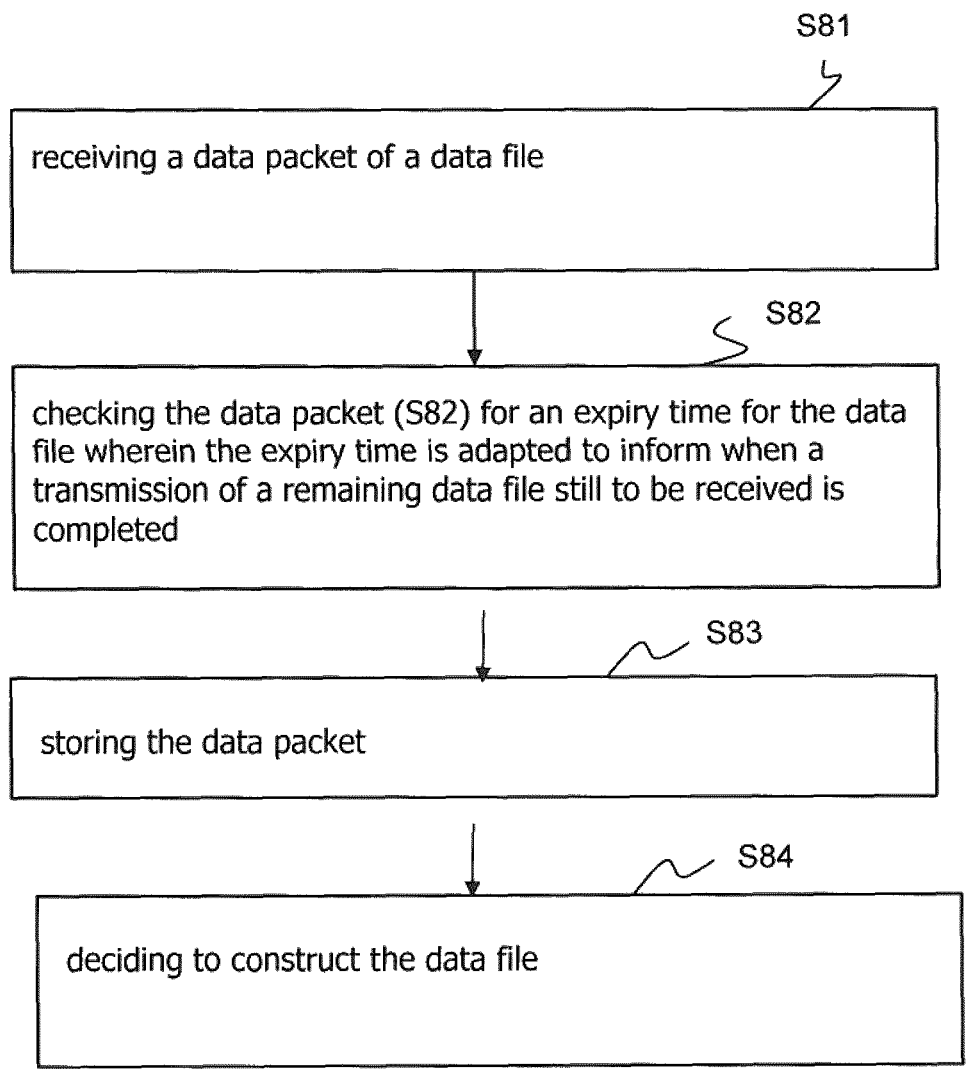
FIG. 8 shows a flowchart of a method on the client side according to one embodiment.

In the following an embodiment of the present disclosure is presented in respect to FIG. 8 showing a flow chart with steps according to an embodiment to be performed on the client side.

In step S81 a data packet of the data file is received at the client side. In step S82 the data packet is checked for an expiry time. The expiry time is adapted to inform when a transmission of a remaining data file still to be received is completed. As next S83 the data packet is stored and a decision procedure is performed S84. The decision procedure is based on the stored data packets and a decision is taken either to reconstruct the data file if enough symbols are present or to discard the stored data packets.

Figure 9:
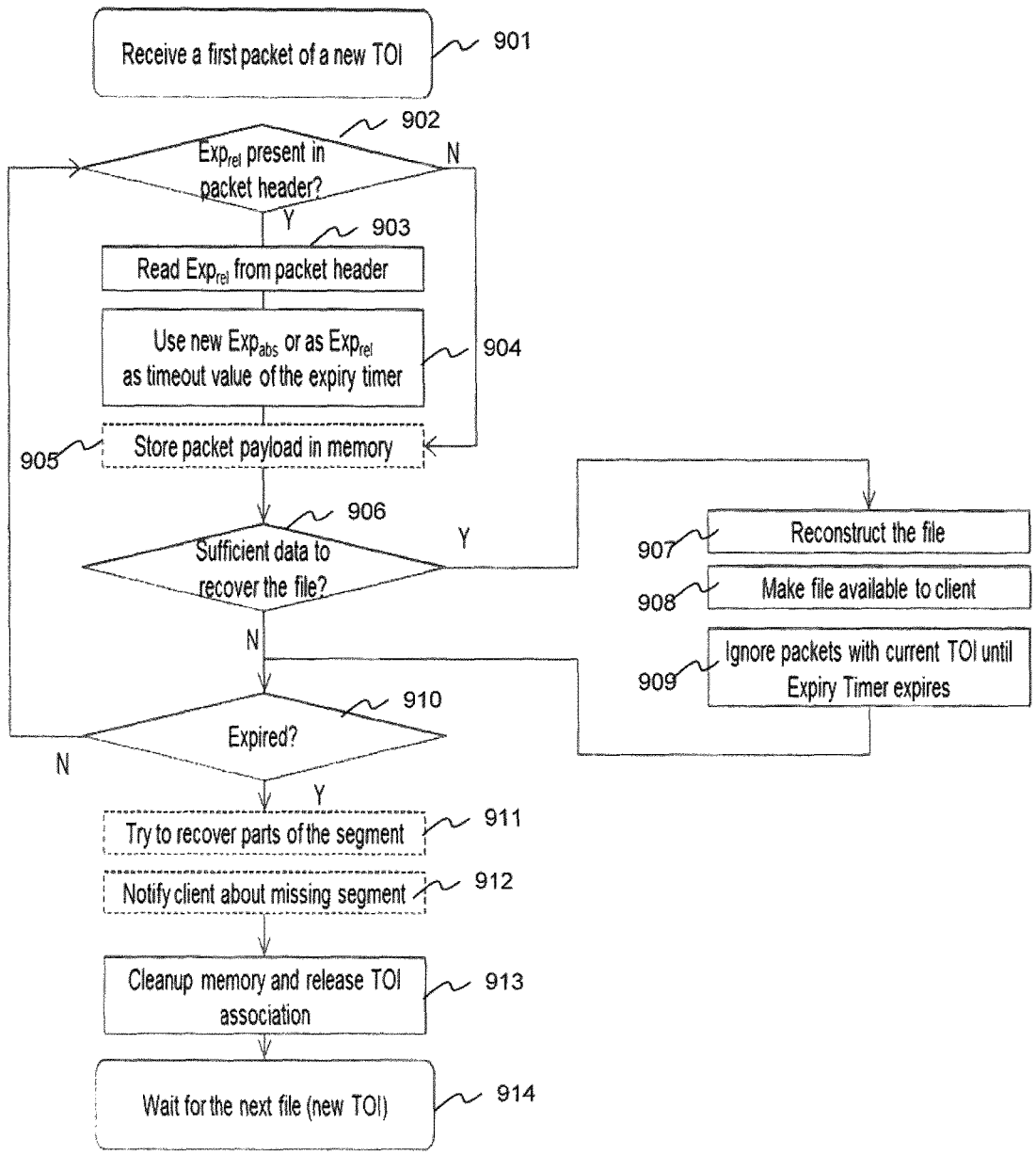
FIG. 9 shows an embodiment for using the expiry time at the client side.

In the following an embodiment of the present disclosure is presented in respect to FIG. 9 showing a flow chart with steps according to an embodiment to be performed on the client side, in particular the usage of the received expiry time at the client side is described.

In a first step, 901 the receiver receives a first packet of a new file (identified by a new TOI, which is not present in the clients TOI database, aka File Delivery Table). As next, the receiver checks, whether the expiry time Exp is present, 902. If the expiry time is present, then the receiver parses the information from the header, 903. The receiver uses the new expiry time, $Exp_{abs}$ or $Exp_{rel}$ as timeout value for the current file. At expiry time the receiver removes the TOI value from the TOI database (aka File Delivery Table). Any subsequently received data packet with that TOI is then regarded as a new data file. In the following two alternatives for using the expiry time are described which depend on the realization of the expiry time, step 904.

a. If the expiry time is realized using a timer as a value showing when the end of transmission will occur, then receiver may use the new relative expiry time directly to check whether it has already expired (e.g. 0 s)
b. If the expiry timer is realized through a comparison against the system time, then the receiver calculates an absolute expiration time using the time of packet reception (i.e. now) as reference. So if the absolute time is provided then the client compares it with the system time at the client side to decide whether the time for reception of the remaining data file has expired.

In the next step, 905, the receiver stores the received packet payload e.g. in memory. As next, 906, the receiver checks, whether it has received sufficient data to recover the file. If the client has sufficient data, then it recovers the file and makes the file available to the player, 907, 908. In one embodiment it is proposed, that the receiver sets an internal marker to ignore all subsequent packets with the same TOI, until the expiry time has expired (909). When the expiry time expires the internal marker is cleared for the particular TOI. In a further embodiment, it is proposed to re-segment the data file and provides it to the player when sufficient data is available independent whether the expiry time expires, 910. If the expiry time has not expired 910, then the receiver waits for the next packet (Go to step 1). If the expiry time is due (e.g. the expiry timer has expired), 910, then the receiver performs a decision procedure by deciding based on the stored data packets either to construct the media file or to discard the stored data packets. The decision may be:

a. The receiver may try to use the received parts, 911
b. The client may notify the video player that a segment is missing, 912

As next, 913, the receiver cleans up the memory, releases the TOI association (i.e. removes the TOI value from its TOI database aka File Delivery Table) and clears the ignore packet marker (909) for that TOI. The system is now ready to use the TOI value as new value for another file again, 914.

Figure 10:
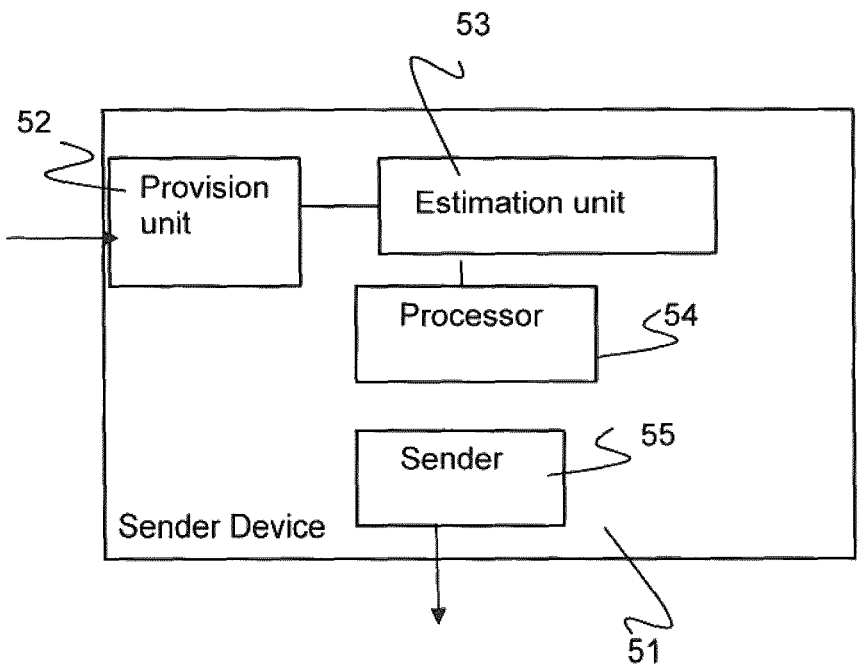
FIG. 10 shows schematically shows a sender device according to one embodiment.

FIG. 10 schematically illustrates exemplary structures for implementing the above-described concepts in a server device 51.

The server device comprises a provision unit 52 adapted to provide the data file comprising data packets and having a data file size. Further there is an estimation unit 53 adapted to estimate a data file transfer duration being based on a transmission bitrate towards the client and the data file size. A processor 54 is adapted to estimate an expiry time of a remaining data file still to be sent when sending a data packet towards the client. The estimation of the expiry time is based on the data file transfer duration and a duration for transmission of already sent data packets so that the expiry time is adapted to inform when the transmission of the data file is completed. Moreover there is a sender 55 unit adapted to signal the estimated expiry time to the client when sending a data packet.

It should be noted that FIG. 10 illustrates various functional units in a server device 51 and the skilled person is able to implement these functional units in practice using suitable software and hardware. Thus, the solution is generally not limited to the shown the functional units 52-55 may be configured to operate according to any of the features described in this disclosure, where appropriate. The server is further adapted to perform the embodiments as described in connection with the functional embodiments.

Figure 11:
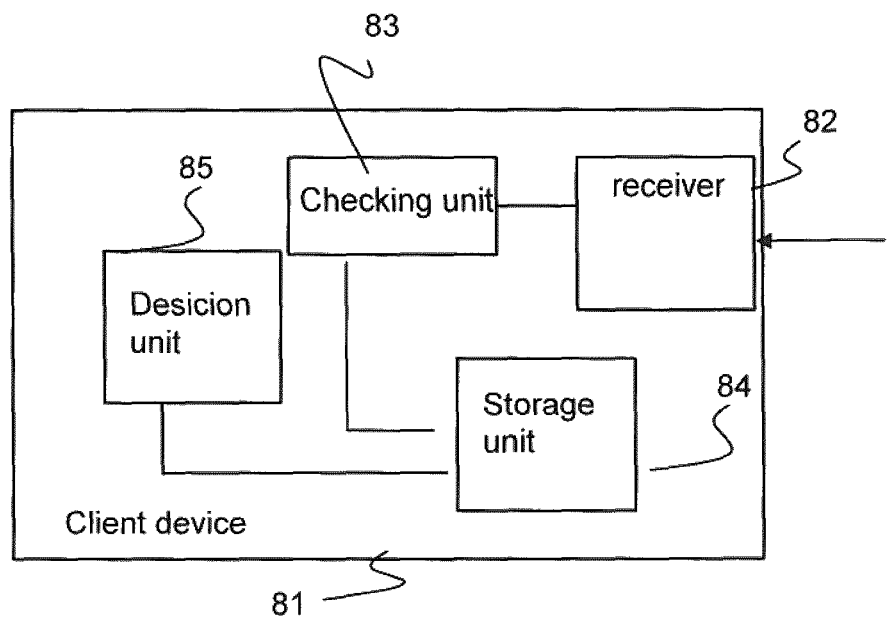
FIG. 11 schematically shows client according to one embodiment.

FIG. 11 schematically illustrates exemplary structures for implementing the above-described concepts on a client device 81.

The client device 81 comprises a receiver adapted 82 to receive a data packet of the data file. Further there is a checking unit 83 adapted to check the data packet for an expiry time for the data file wherein the expiry time is adapted to inform when a transmission of a remaining data file still to be received is completed. Moreover there is a storage 84 adapted to store the data packet and a decision unit 85 adapted to decide on construction of the data file.

It should be noted that FIG. 11 illustrates various functional units in the client device 81 and the skilled person is able to implement these functional units in practice using suitable software and hardware. Thus, the solution is generally not limited to the shown structures of the user equipment and the functional units 82-85 may be configured to operate according to any of the features described in this disclosure, where appropriate.

The functional units 52-55 and 82-85 described above may be implemented in the corresponding device 51 or 81 by means of program modules of a respective computer program comprising code means which, when run by a processor causes the corresponding device 51 or 81 to perform the above-described actions and procedures. The processor may comprise a single Central Processing Unit (CPU), or could comprise two or more processing units. For example, the processor may include a general purpose microprocessor, an instruction set processor and/or related chips sets and/or a special purpose microprocessor such as an Application Specific Integrated Circuit (ASIC).

A computer program may be carried by a computer program product in the corresponding device 51 or 81 in the form of a memory having a computer readable medium and being connected to the processor. The computer program product or memory thus comprises a computer readable medium on which the computer program is stored e.g. in the form of computer program modules. For example, the memory may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the corresponding device 51 or 81.

It is to be understood that the examples and embodiments as explained above are merely illustrative and susceptible to various modifications. For example, the concepts could be used in other types of mobile communication networks, not explicitly mentioned so far. Further, it is to be understood that the above concepts may be implemented by using correspondingly designed software in existing nodes, or by using dedicated hardware in the respective nodes.

The invention claimed is:

1. A method for providing a data file comprising data packets wherein the data packets are transmitted from a sender to a client over a communication network, the method comprising:
    receiving a data packet of the data file;
    checking the data packet for an expiry time for the data file wherein the expiry time is adapted to inform when a transmission of a remaining data file still to be received is completed;
    storing the data packet; and
    deciding on construction of the data file, wherein deciding on construction of the data file comprises:
        recovering the data file based on the stored data; and
        ignoring subsequent data packets with a same identity number identifying a data file.

2. The method according to claim 1, wherein checking the data packet for an expiry time for the data file comprises reading out the header of the received data packet.

3. The method according to claim 1, wherein checking the data packet for an expiry time for the data file comprises reading out a FLUTE packet carrying the expiry time assigned to a file delivery descriptor entry.

4. The method according to claim 1, wherein the expiry time is a relative time describing a remaining time for reception of the remaining data packets.

5. The method according to claim 1, wherein the expiry time is an absolute time and the remaining time for reception of the remaining data packets is a difference between the received expiry time and the current absolute system time.

6. The method according to claim 1, wherein deciding on construction of the data file comprises performing an error concealment procedure.

7. The method according to claim 1, further comprising setting an internal marker indicating that subsequent data packets with the same identity number are to be discarded.

8. The method according to claim 7, wherein when the expiry time expires the internal marker is cleared for the particular identity number.

9. The method according to claim 1, wherein deciding on construction of the data file comprises performing a file repair procedure and re-questing a retransmission of data packets.

10. The method according to claim 1, further comprising cleaning up a memory by removing the stored data packet.

11. The method according to claim 1, further comprising releasing the identity number to be used for another data file again.

12. The method according to claim 1, wherein the identity number is a Transport Object Identifier TOI.

13. A client device adapted to provide a data file comprising data packets wherein the data packets are transmitted from a sender to the client device over a communication network, the client device comprising:
    one or more processing circuits configured to:
        receive a data packet of the data file;
        check the data packet for an expiry time for the data file wherein the expiry time is adapted to inform when a transmission of a remaining data file still to be received is completed;
        store the data packet; and
        decide on construction of the data file, wherein to decide on construction of the data file the one or more processing circuits are further configured to:
            recover the data file based on the stored data; and
            ignore subsequent data packets with a same identity number identifying a data file.

14. The client device according to claim 13, wherein to check the data packet for an expiry time for the data file, the one or more processing circuits are further configured to read out the header of the received data packet.

15. The client device according to claim 13, wherein to check the data packet for an expiry time for the data file, the one or more processing circuits are further configured to read out a FLUTE packet carrying the expiry time assigned to a file delivery descriptor entry.

16. The client device according to claim 13, wherein the expiry time is a relative time describing a remaining time for reception of the remaining data packets.

17. The client device according to claim 13, wherein the expiry time is an absolute time and the remaining time for reception of the remaining data packets is a difference between the received expiry time and the current absolute system time.

18. The client device according to claim 13, wherein to decide on construction of the data file, the one or more processing circuits are further configured to perform an error concealment procedure.

19. The client device according to claim 13, wherein the one or more processing circuits are further configured to set an internal marker indicating that subsequent data packets with the same identity number are to be discarded.

20. The client device according to claim 19, wherein when the expiry time expires the internal marker is cleared for the particular identity number.

21. The client device according to claim 13, wherein to decide on construction of the data file, the one or more processing circuits are further configured to perform a file repair procedure and request a retransmission of data packets.

22. The client device according to claim 13, further comprising cleaning up a memory by removing the stored data packet.

23. The client device according to claim 13, wherein the one or more processing circuits are further configured to release the identity number to be used for another data file again.

24. The client device according to claim 13, wherein the identity number is a Transport Object Identifier TOI.

* * * * *